May 8, 1934.   H. R. TEAR   1,958,216
LUBRICATING DEVICE
Filed Dec. 13, 1932
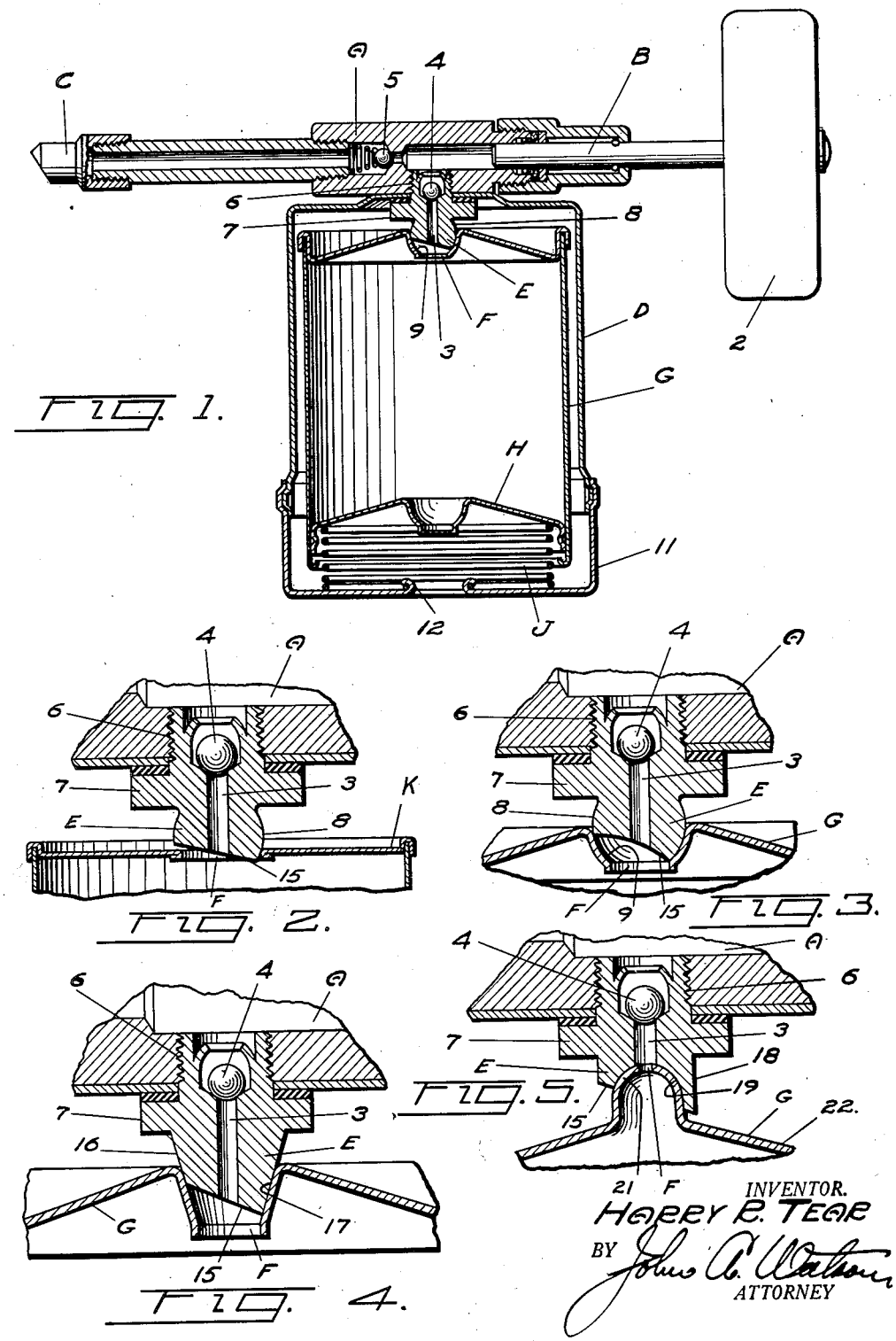
INVENTOR.
HARRY R. TEAR
BY
ATTORNEY Patented May 8, 1934

1,958,216

UNITED STATES PATENT OFFICE 1,958,216

LUBRICATING DEVICE

Harry R. Tear, South Bend, Ind., assignor to The Lubrication Corporation, South Bend, Ind., a corporation of Delaware Application December 13, 1932, Serial No. 647,011

6 Claims. (Cl. 221—47.3)

This invention relates to improvements in lubricating devices and, more particularly, to lubricant cartridge connecting means for establishing fluid tight connection between lubricant cartridges and lubricating guns, feeding devices and dispensers.

An object of the invention is to provide a cartridge connector stud for a lubricant gun or other lubricant feeding device adapted to provide a lubricant tight seal by contact under thrust with the walls of an outlet opening of a specific type of lubricant cartridge wherein the said outlet walls are fashioned to cooperate with the external surface of the stud and which prohibits the establishment of a lubricant tight seal with cartridges other than those specifically designed for use with the gun or other lubricant feeding apparatus. This feature assures the use of the proper lubricant both as to quality and species for the gun or device so equipped when it becomes necessary for the operator to purchase cartridge refills.

Another object is to provide a cartridge connector stud as described which may be manufactured at relatively low cost and which may be readily removed and replaced with one of conventional structure, if desired.

Other objects, the advantages and uses of the invention will be or should be apparent after reading the following description and claims and after considering the accompanying drawing, in which:

Fig. 1 is a sectional view of a hand lubricant gun equipped with a cartridge connector stud and cartridge constructed in accordance with the invention;

Fig. 2 is an enlarged fragmentary sectional view of the connector stud of Fig. 1 illustrating the attempted use of a cartridge other than one specifically designed therefor;

Fig. 3 is an enlarged fragmentary sectional view of a modified form of the connector stud for use with the cartridge of Fig. 1;

Fig. 4 is a view similar to Fig. 3 of another form of connector stud and cartridge outlet; and Fig. 5 is a view similar to Fig. 3 of a further form of the stud and cartridge outlet construction.

In general, the apparatus selected for illustration herein comprises, a hand lubricant gun having a pump cylinder A, a manually operable piston B, a discharge nozzle C, a cartridge housing D, a cartridge connector stud E through which lubricant may be admitted to the cylinder A, having its external surface adapted for contact with the inner surface of the side walls of the outlet opening F of a lubricant cartridge G receivable within the housing D, a piston H forming a movable end closure for the remote end of the cartridge and a compression spring J bearing upon the piston H to place the lubricant contents of the cartridge under slight pressure and to thrust the cartridge upwardly into close contact with the connector stud E. A feature of the invention consists in truncating the connector stud E at an angle other than 90° to its longitudinal axis thereby causing one side wall of the stud to extend further away from the gun cylinder than its opposed side.

Referring in particular to Fig. 1 the hand gun shown therein is one of a well known type including a hand grip 2 for the manual reciprocation of the piston B within the cylinder A. Lubricant is admitted to the cylinder through an inlet port comprising a central passageway 3 through the stud E having a ball check valve 4 therein to prevent the return flow of lubricant during the pressure stroke of the piston. A spring pressed cylinder outlet check valve 5 is located between the forward end of the cylinder and the discharge nozzle C to assure a reduced pressure in the cylinder during the return stroke of the piston for drawing lubricant into the cylinder and to prevent the return of lubricant through the discharge nozzle under back pressure in the bearing or part lubricated. The connector stud E may be secured to the cylinder A through the medium of an externally threaded shank 6. The stud may be further formed with a hexagonal flange 7 for reception between the jaws of a wrench as when the stud is screwed in place and by means of which, the housing D is held in place upon the gun cylinder as shown.

In the structure of Figs. 1 to 3, the outer wall surface of the connector stud is spherical as shown at 8 and the inner wall 9 of the cartridge outlet opening F of the cartridge G is similarly formed so as to provide a universal contact joint therebetween, a feature which provides for an adequate lubricant tight seal between the stud and the cartridge outlet opening even though the cartridge becomes slightly canted within the housing D. To facilitate the installation and removal of the cartridge to and from the gun, a removable cap 11 is provided for the housing D, to which the lower end of the spring J may be permanently fixed as indicated at 12.

With the parts assembled as shown in Fig. 1 the spring J serves to place the lubricant contents of the cartridge G under slight pressure and to transmit thrust, through the lubricant, to the cartridge in the direction of the connector stud E, thereby causing a lubricant tight seal between the stud E and cartridge outlet walls 9 in direct proportion to the pressure to which the lubricant in the cartridge is subjected. The outer end wall 15 of the connector stud formed by the truncating of the stud E as shown in Figs. 1 and 3 lies well beyond the contacting surfaces of the stud and cartridge outlet wall so as not to destroy the annular seal therebetween. If, however, attempt is made to install a cartridge K of conventional structure representing other than that type of cartridge intended for use with the gun or feeding apparatus, the result, as shown in Fig. 2, will be that the truncated portion of the stud prohibits the formation of a lubricant tight seal between stud and cartridge outlet opening or any satisfactory communication therebetween. The operator is thus protected against the unintentional use of lubricants other than those expressly compounded for the particular gun or apparatus in use.

The cartridge connector stud of Fig. 3 differs from that of Figs. 1 and 2 only in that the wall 15 of the stud is cylindrical and concave whereas the wall 15 of the latter is flat.

Another form of the connector stud E and cartridge outlet opening F is illustrated in Fig. 4, wherein the outer wall 16 of the stud is conical and truncated to provide an inclined flat end wall 15. The wall 17 of the outlet opening F is likewise of conical contour to correspond with the wall 16 of the stud. The function and operation of this form of the cartridge connector means is identical to that heretofore described except that a universal sealing contact between the stud and cartridge of a nature to permit canting of the cartridge is absent.

In Fig. 5 a further form of the stud and cartridge outlet is shown wherein the stud E is formed with straight non-functional side walls 18 and is truncated at an angle other than 90° to form an inclined end wall 15. The end wall 15 is further formed with a hemispherical pocket 19 therein communicating with the passage 3 of the stud within which an embossed spherical surfaced extension 21 of the cartridge end wall 22 is adapted to fit. The cartridge outlet opening F consists of a relatively small aperture formed through the central portion of the extension 21 and is therefore aligned with the passage 3 of the stud. In this form of the cartridge connector means, universal contact between the stud and cartridge is attained as in the forms of Figs. 1 and 3, and the truncating of the stud prohibits the successful use of other than the particular design of cartridge intended for use with the gun.

The angle of inclination of the end wall 15 relative to the axis of the stud E depends in part upon the depth to which the stud enters within the side walls of the cartridge outlet opening, but it is suggested that for best results that it lie with a range of from 10° to 40° from a plane perpendicular to the axis of the stud.

It is to be understood that the embodiments of the invention herein set forth are presented for the purpose of illustration only, and various changes may be made therein without departing from the spirit and scope of the appended claims.

I claim:

1. A cartridge connector stud, for establishing a fluid connection between a fluid dispensing device and an apertured fluid-containing cartridge, said stud having a spherical contact surface for contact with the wall portion of said cartridge about said aperture, the outer end of said stud being cut away in a plane inclined with respect to the longitudinal axis of the stud.

2. Cartridge connector means for providing a detachable fluid connection between a lubricant cartridge and a lubricant dispensing apparatus comprising, a tubular member adapted to be fixed to said dispensing apparatus to serve as a lubricant inlet therefor, said member having a substantially spherical walled pocket formed in its outer end communicating with the bore thereof and being truncated in a plane intersecting said pocket and inclined with respect to the longitudinal axis of the member.

3. A cartridge connector stud comprising, a shank and a normally exposed spherical cartridge-engaging body portion, said body portion being truncated in a plane inclined with respect to the axis of the shank at an angle other than 90°.

4. A cartridge connector stud for establishing a fluid connection between a fluid dispensing device and an apertured fluid-containing cartridge comprising, a body having a fluid conducting passageway therethrough, said body having a sealing surface extending completely about one end portion of said passageway, said sealing surface being bounded at one side by a surface the general plane of which lies at an angle between a straight angle and a right angle to the axis of said end portion of said passageway.

5. A cartridge connector stud for establishing a fluid connection between a fluid dispensing device and an apertured fluid-containing cartridge comprising, a body having a fluid conducting passageway therethrough, said body having an external sealing surface completely surrounding said passageway, said surface being a spherical zone bounded at one side by a perimeter that lies at an angle between a straight angle and a right angle to the axis of said body.

6. A cartridge connector stud for establishing a fluid connection between a fluid dispensing device and an apertured fluid-containing cartridge comprising, a body having a fluid conducting passageway therethrough, said body having an annular sealing surface extending completely about one end of said passageway, said sealing surface being bounded at one side by a surface, the general plane of which lies at an angle between a straight angle and a right angle to the axis of said body.

HARRY R. TEAR.